Figures 1, 2:
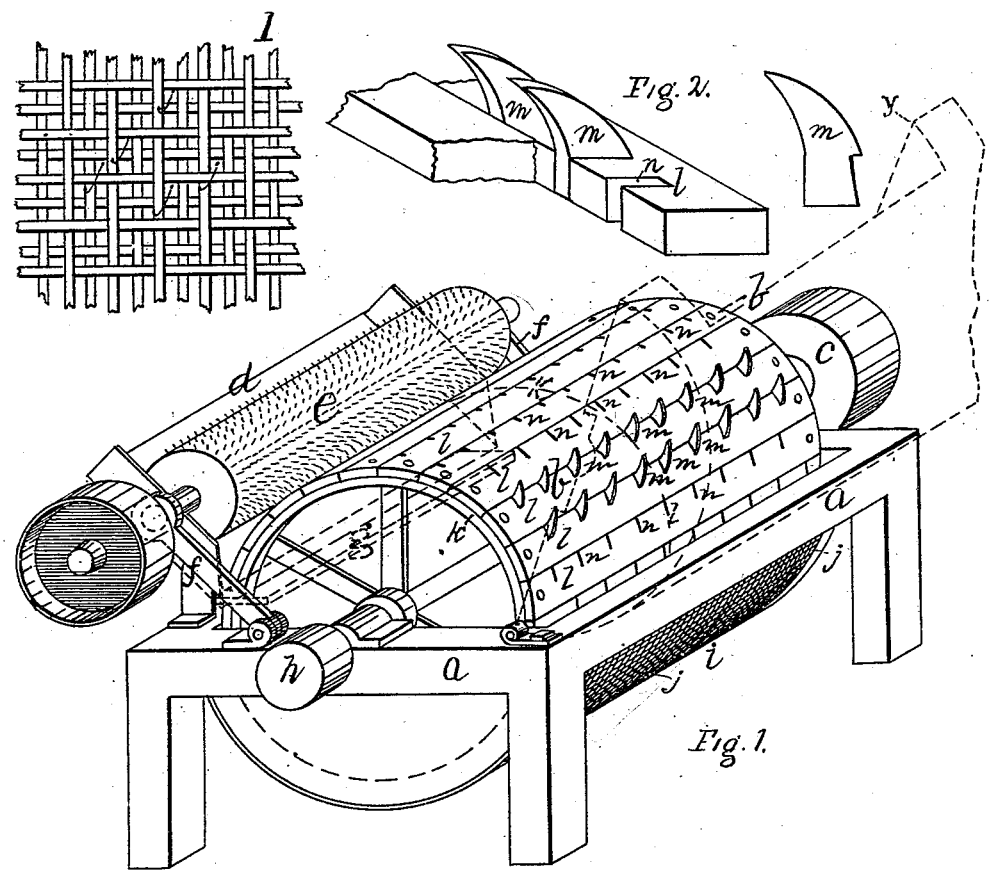

W. SHAW.
Bark-Reducing Machine.

No. 211,798. Patented Jan. 28, 1879.

Witness
Joseph F. Smith

Inventor
William Shaw
by Wm. Franklin Seavey Atty.

UNITED STATES PATENT OFFICE.

WILLIAM SHAW, OF KINGMAN, MAINE.

IMPROVEMENT IN BARK-REDUCING MACHINES.

Specification forming part of Letters Patent No. 211,798, dated January 28, 1879; application filed March 4, 1878.

*To all whom it may concern:*

Be it known that I, WILLIAM SHAW, of Kingman, in the county of Penobscot and State of Maine, have invented certain new and useful Improvements in Bark-Cutting Machines; and I do hereby declare that the following is a full, clear, and exact description of the invention, that will enable others skilled in the art to which it appertains to make and use the same, reference being had to the accompanying drawings, forming a part of this specification, in which—

Figure 1 shows a perspective; Fig. 2, detail of slots and tooth; I, detail of screen.

Same letters show like parts.

My invention consists of certain improvements in bark-cutting machines, which will be readily understood by reference to the accompanying drawings, in which—

$a$ shows a suitable frame, supporting a rotary cutting-drum, $b$, actuated by a belt passing over a pulley, $c$. At $d$ is an inclined chute, upon which the bark is placed, having a roll, $e$, resting therein, by which the feeding is done. This roll is mounted on hinged arms $ff$, allowing it to adjust itself to bark varying in thickness, and receives motion from a belt from a pulley, $h$, on the shaft of the cutting-drum.

Below the chute is a guard or bar, $g$, against which the bark rests while being cut. Below the drum $b$, and inclosing its lower half, is a screen, $i$, having holes $j$ therein of proper size to pass all pieces of bark sufficiently fine for tanning purposes, larger pieces being retained and carried round by the rotation of the drum $b$, to be again acted upon by the teeth. This screen may be made of perforated iron plate or of wire-netting, one or more layers of which may be employed.

The upper half of the cutting-drum is covered by a cover, $y$, when in use, so that the drum is entirely inclosed by the screen and cover, with the exception of the opening for the presentation of the bark. This upper cover is shown in dotted lines in Fig. 1, and prevents the escape of the uncut pieces of bark, insuring their re-presentation to the teeth.

To annular or circular heads $k$ are bolted bars $l\ l$, forming, when in place, a drum carrying teeth $m$. These teeth are secured by being set in slots $n$, cut partially through the width of the bars, being held in said slots by the abutting edge of the next bar. The rear edge of the tooth within the slot may be slightly beveled or inclined, as shown.

To repair or replace a tooth it is only necessary to remove the bolts from the ends of the bar containing it and raise it from its place in the drum, when the repairs or substitution may be made without disturbing any of the remaining teeth.

Intermediate heads $k\ k$ may be used, if desired, and the bars shortened. (See dotted lines $k\ l$ in Fig. 1.)

By the use of the inclined chute I present the bark to the cutting-drum at an angle, as will be seen. This, in a great measure, prevents the breakage of the bark and leaves the particles more uniform in size.

I do not claim an inclined chute, broadly, as applied to all classes of machines for all purposes.

I am aware that an inclined chute in itself is old, and has been used for various purposes. I claim it applied, as described, to a bark-cutting machine, in which it has the effect of preventing the breaking or biting out of pieces of bark by the revolving teeth of the drum, the bark being brittle and liable to break in large pieces when presented to the cutters on a horizontal plane.

What I claim as my invention, and desire to secure by Letters Patent, is—

1. The combination of the drum $b$, inclined chute $d$, whereby the bark is presented to the cutters at an angle, and feed-roll $e$, said feed-roll being supported on hinged arms $f\ f$, and resting upon the bottom of said inclined chute, substantially as specified.

2. In a bark-cutting machine, a drum, $b$, formed of separate bars $l\ l$, bolted to heads $k\ k$, and carrying teeth $m$, held in slots $n$ by the abutting edge of the next bar, substantially as described and shown.

In testimony that I claim the foregoing I have hereunto set my hand this 26th day of February, 1878.

WILLIAM SHAW.

Witnesses:
JOHN R. MASON,
WM. FRANKLIN SEAVEY.